United States Patent [19]

Balling et al.

[11] Patent Number: 5,678,109
[45] Date of Patent: Oct. 14, 1997

[54] CAMERA INTERIOR LIGHT LOCK

[75] Inventors: Edward Norman Balling, Rochester; Thomas Edgar Dussinger, Henrietta, both of N.Y.

[73] Assignee: Eastman Kodak Company, Rochester, N.Y.

[21] Appl. No.: 602,395

[22] Filed: Feb. 16, 1996

[51] Int. Cl.$^6$ .................................................. G03B 17/02
[52] U.S. Cl. ...................................... 396/535; 396/399
[58] Field of Search ............................. 354/213, 288; 396/395, 396, 400, 403, 401, 399, 348, 535

[56] References Cited

U.S. PATENT DOCUMENTS

| | | | |
|---|---|---|---|
| 2,169,548 | 8/1939 | Zapp | 396/401 |
| 2,544,879 | 3/1951 | Harvey et al. | 396/392 |
| 2,847,920 | 8/1958 | Polhemus | 396/394 |
| 3,696,723 | 10/1972 | Ernisse | 396/400 |
| 3,938,170 | 2/1976 | Winkler et al. | 396/348 |
| 3,968,509 | 7/1976 | Winkler et al. | 396/400 |
| 3,999,199 | 12/1976 | Beach | 396/400 |
| 4,032,940 | 6/1977 | Chan | 396/348 |
| 4,104,664 | 8/1978 | Winkler et al. | 396/400 |
| 4,107,715 | 8/1978 | Tanaka | 396/399 |
| 4,115,792 | 9/1978 | Engelsmann et al. | 396/400 |
| 4,154,519 | 5/1979 | Waaske | 396/395 |
| 4,948,063 | 8/1990 | Niedospial, Jr. | 396/512 |
| 5,003,330 | 3/1991 | Kotani et al. | 396/176 |
| 5,005,035 | 4/1991 | Pagano | 396/396 |
| 5,031,853 | 7/1991 | Jensen | 396/516 |
| 5,151,727 | 9/1992 | Sasaki | 396/301 |
| 5,248,108 | 9/1993 | Zander | 396/513 |
| 5,357,302 | 10/1994 | Kawmaura et al. | 396/399 |
| 5,394,214 | 2/1995 | Petruchik | 396/535 |
| 5,400,098 | 3/1995 | Rydelek | 396/535 |
| 5,481,325 | 1/1996 | Wada et al. | 396/538 |

FOREIGN PATENT DOCUMENTS 6-347950 12/1994 Japan.

Primary Examiner—D. Rutledge
Attorney, Agent, or Firm—Peter J. Bilinski; Robert Luke Walker

[57] ABSTRACT

A camera includes a frame having a movably attached film engaging member including a metering pawl for engaging a contained filmstrip. A light locking cover attached to the frame prevents ambient light from entering a defined light tight enclosure surrounding the film engaging member with the exception of an opening to allow a locking portion of a second movable lever within the lighttight enclosure for engaging the film engaging member. The lever includes an integral light locking portion adjacent the locking portion which blocks the opening of the first light locking cover but allows the locking portion to engage the film engaging member. The access opening of the light locking cover is sufficiently large to allow pivoting movement of the locking portion, the cover preferably including a recess to allow the light blocking portion of the lever to effectively cover the opening in a lighttight manner.

14 Claims, 6 Drawing Sheets

CAMERA INTERIOR LIGHT LOCK

CROSS-REFERENCE TO RELATED APPLICATION(S)

Reference is made to commonly assigned copending applications Ser. No. 08/577,285, entitled: PUMP CAMERA, filed in the names of Dennis R. Zander, David C. Smart, Thomas Dussinger, and Edward N. Balling, Ser. No. 08/577,288 entitled: FILM METERING MECHANISM, filed in the names of Thomas E. Dussinger, Dennis R. Zander, David C. Smart, and Edward N. Balling, and Ser. No. 08/577,785 entitled CAMERA WITH FILM METERING RESPONSIVE SHUTTER RELEASE, filed in the names of Edward N. Balling, David C. Smart, Thomas E. Dussinger, and Dennis R. Zander, each of which are assigned to the assignee of this application.

FIELD OF THE INVENTION

The invention relates generally to the field of photography, and in particular to still photographic cameras. More specifically, the invention relates to an interior light lock for the filmstrip metering mechanism of a camera.

BACKGROUND OF THE INVENTION

In order for conventional still photographic cameras to operate, it is essential that a contained filmstrip be shielded from ambient or other light until the filmstrip has been rewound, in the case of conventional wind cameras, or wound in the case of so-called pre-wind cameras, into the confines of a lighttight film cartridge.

The ability to seal light from a given area within a camera is well known. However, the ability to seal light from a given area, where two independent parts interact with each other, one enclosed in a light sealed area, and the other outside the light seal in which at least one of the parts is movable, is not.

In a particular film metering mechanism, a film engaging member is movably attached to a camera frame, and is locked and unlocked by a pivotable demetering lever. The film engaging member includes a metering pawl which engages the filmstrip, therefore, a light lock must be provided. The demetering lever, however, must engage with the film engaging member in order for the film metering mechanism to operate.

One way to create an effective light seal is to cover each of the respective components to insure that ambient light does not impinge on the filmstrip. Though such a design may be effective, overriding the design of an effective light lock are consumer driven needs for compactness and reduced cost. Further, because the demetering lever is also engaged separately to other camera components, it would be necessary to extend the light lock accordingly.

There is a need, therefore, to provide an effective interior light lock for the camera which provides is effective, while simultaneously allowing functional engagement of the locking lever with the film metering member.

SUMMARY OF THE INVENTION

The present invention is directed to overcoming one or more of the problems set forth above. Briefly summarized, according to one aspect of the present invention, there is provided a camera comprising:
  a frame;
  a movable film engaging member attached to said frame;
  means for locking and unlocking the movable film engaging member; and
  light lock means for preventing ambient light from striking a filmstrip engaged by the film engaging member, is characterized by:
    a first light locking cover for covering the movable film engaging member, said cover having an opening for allowing the locking and unlocking means to engage the film engaging member wherein said locking and unlocking means includes a second light locking cover for covering said opening while allowing said means to engage the film engaging member.

According to another aspect of the present invention, there is provided a combination comprising:
  a first member; and
  first light locking means having a defined lighttight enclosure for preventing ambient light from impinging on said first member; is characterized by:
    a second member having a portion for engaging said first member and second light locking means for allowing said engaging portion to enter said lighttight enclosure while preventing light from entering the lighttight enclosure.

An advantage realized by the present invention is that an effective light lock is provided for a movable film engaging member of a film metering mechanism of a camera, in which a non-light locked element can engage with and disengage from a light locked film engaging member while maintaining the integrity of the light lock.

Another advantage of the present invention is that an interior light lock can be provided without requiring an excess of space, allowing a camera incorporating the present invention to be compact.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

Figure 1:
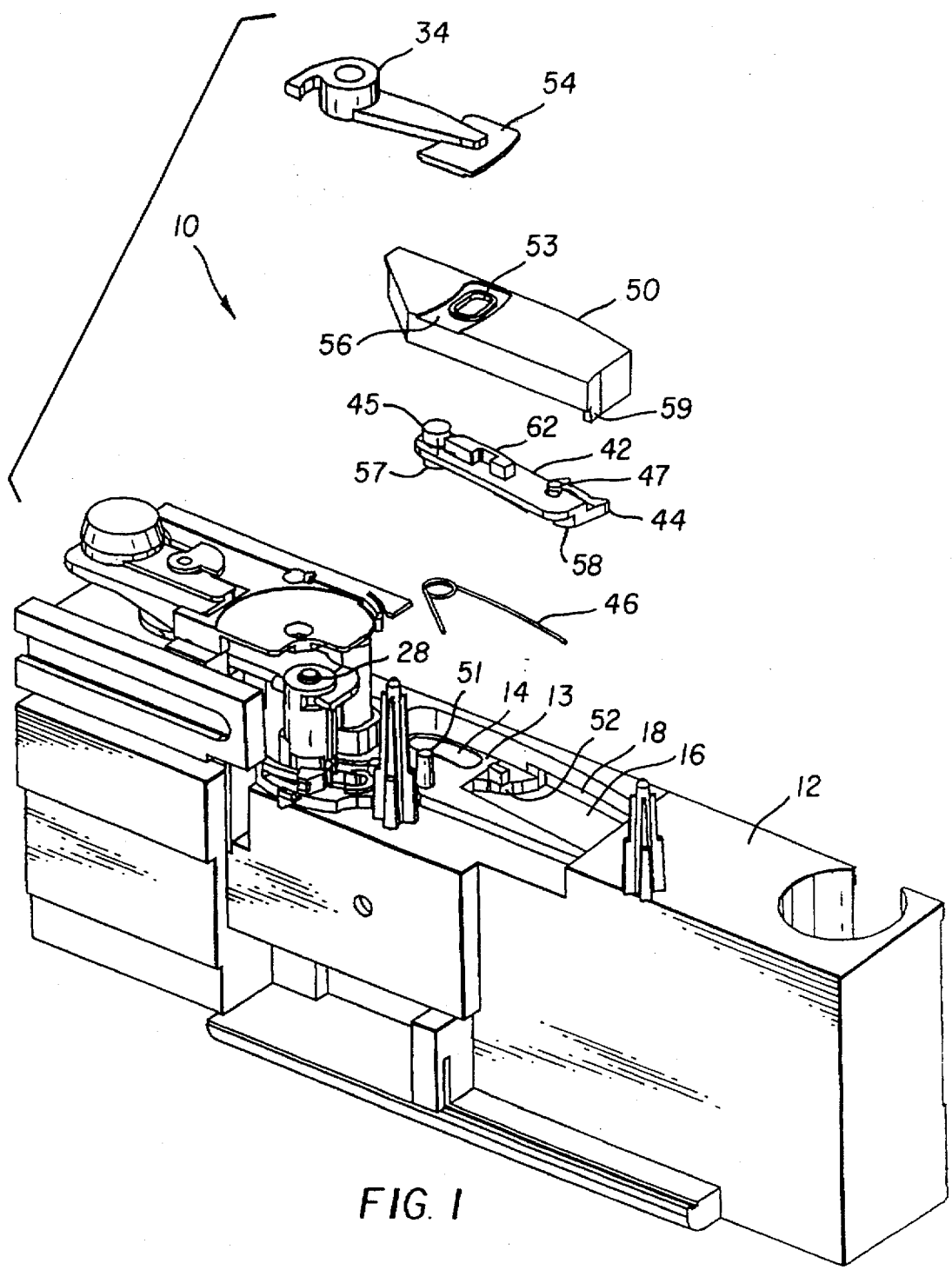
FIG. 1 is a partially exploded front perspective view of a camera frame according to a preferred embodiment of the present invention.

The present invention is herein described with reference to a preferred embodiment in a specific type of pump-action camera. It will become apparent, however, that the light locking mechanism of the present invention can be utilized in literally any camera having movable film engaging components, particularly those in which a film engaging component requiring a light lock must interact with other non-light locked camera components.

The present embodiment is described with reference to FIGS. 1–6. Beginning with FIG. 1, there is shown a partial perspective view of a camera 10, showing in particular a frame 12 for supporting a number of photographic components, including a film metering mechanism 20, FIG. 2. The camera frame 12 is sandwiched between respective front and rear covers (not shown) in a conventional manner, the description of which requires no further elaboration pertaining to the present invention, except as relating to FIGS. 3 and 4, below.

Of particular import relating to the film metering mechanism 20, FIG. 2, and as described in greater detail below, is a movable metering pawl member 42 which is fitted to the top surface 13 of the frame 12, and is positionally biased by a torsion spring 46. A demetering lever 34 attached to the exterior of the frame 12 engages the film metering member 42, in the manner described below, and includes a secondary light blocking portion 54, for covering an opening of a light blocking cover 50.

Figure 4:
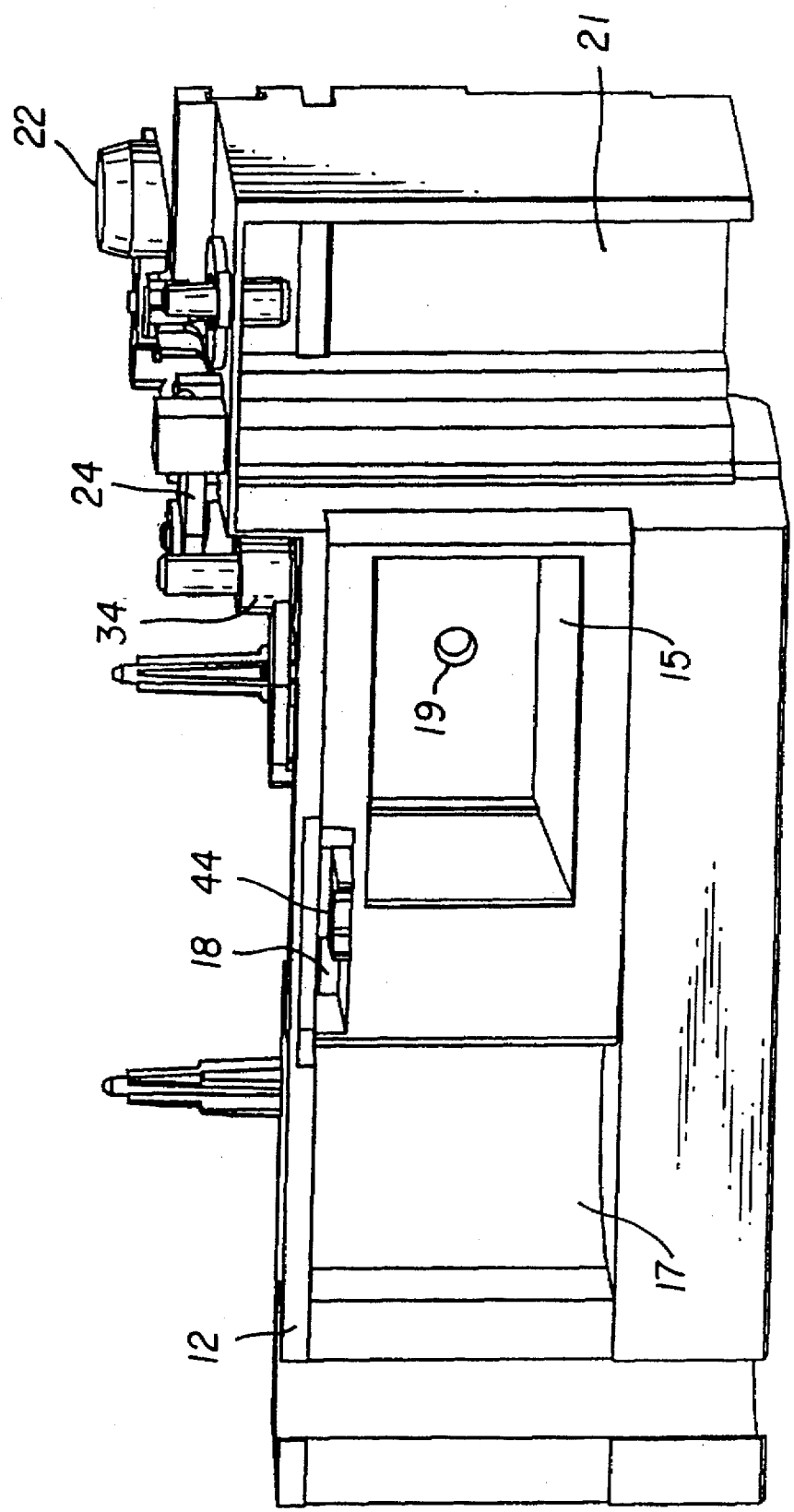
FIG. 4 is a partial rear perspective view of the camera of FIGS. 1 and 3.

For background purposes, the following discussion describes the need for the present invention. Turning first to FIG. 4, the camera 10 is of the pre-wind type in which an unexposed roll of film (not shown) is contained in a film roll chamber 17 having an opening in the back of the camera frame 12, adjacent an exposure chamber 15 having a similar opening.

Figure 2:
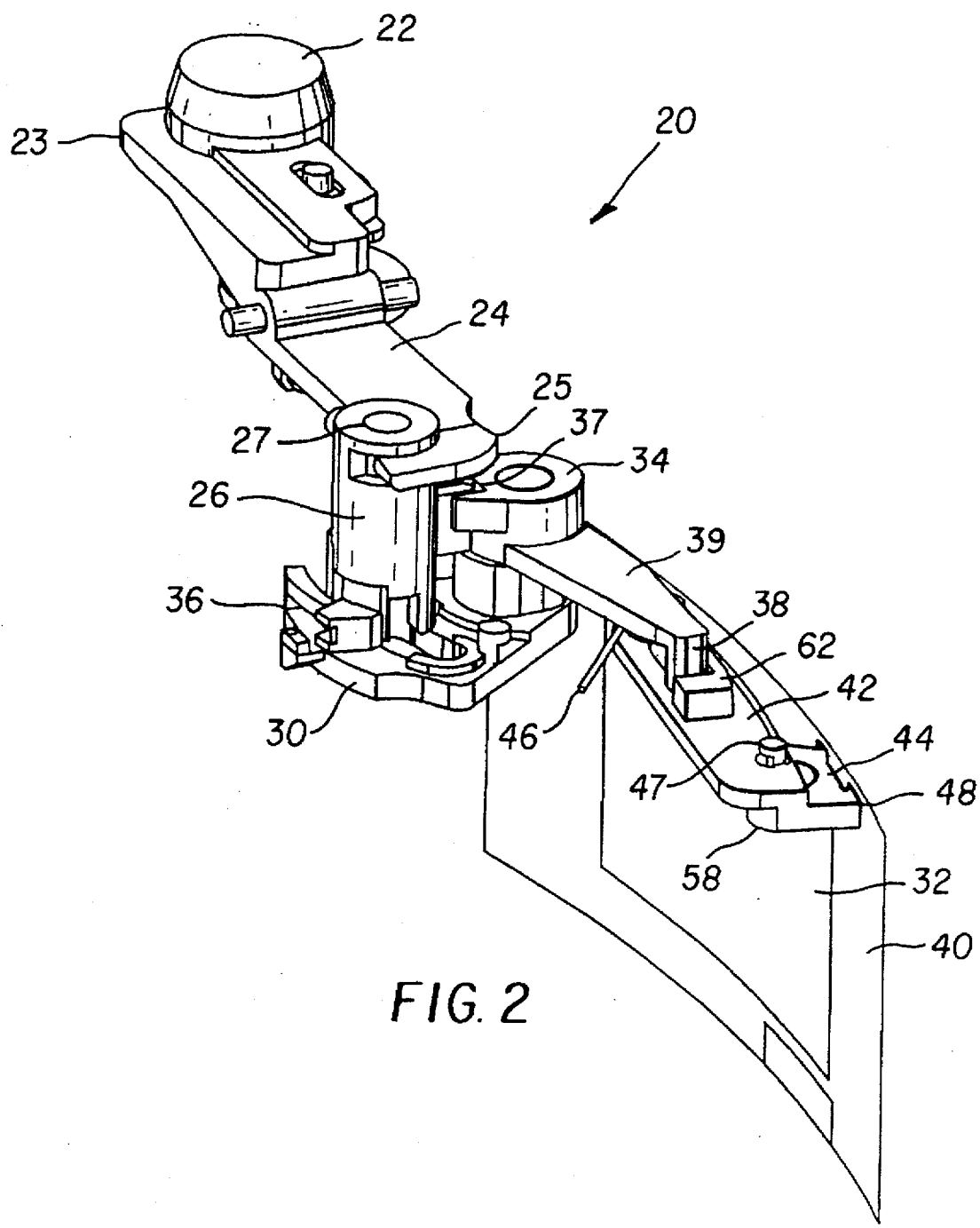
FIG. 2 is a partial perspective view of the film metering mechanism of the camera as separated from the camera frame of FIG. 1.

Still referring to FIG. 4, and as exposures are taken by the user, the filmstrip 40, FIG. 2, is transported in a frame-by-frame manner from the film roll chamber 17 to the exposure chamber 15, and sequentially by a film advancing mechanism (not shown) of the camera 10 to an oppositely disposed film cartridge chamber 21 as the film is drawn into the confines of a lighttight film cartridge (not shown). The film cartridge chamber 21 according to this embodiment includes a rear opening and a bottom opening. After all of the exposures have been taken, the film cartridge (not shown) is withdrawn from the bottom opening of the film cartridge chamber 21 for processing. Such cameras are basically described in U.S. Pat. No. 5,063,400, among others.

The interiors of the respective camera chambers 15, 17, and 21 prevent light entry with the exception of the rear openings, and the bottom opening in the case of the film cartridge chamber, and a taking lens opening 19 disposed in the front of the exposure chamber 15. When the rear cover (not shown) is attached to the back of the camera frame 12 in a known manner, such as described by the '400 patent above, each of the chamber rear openings, as well as the bottom opening of the film cartridge chamber 21 are completely covered and ambient light is prevented from impinging on the contained filmstrip 40, FIG. 2.

Still referring to FIG. 4, and in the present camera 10, after the rear cover (not shown) is attached to the camera frame 12, the filmstrip path is completely shielded from ambient light with the exception of a slot 18 located between the film roll chamber 17 and the exposure chamber 15.

In passing, it will become readily apparent that the concepts should not be limited to the specific camera described; that is, the direction of the filmstrip is incidental to the workings of the present invention.

It is now necessary to briefly describe the film metering mechanism 20 of the present embodiment. Referring to. FIGS. 1 and 2, a portion of a pump-action camera 10 is shown including a depressible shutter release button 22 attached to one end 23 of a pivotable beam-like trigger 24 attached to the exterior of the frame 12. The remaining end 25 of the trigger 24 is attached to a metering release element 26 which is mounted over a post 28 of the frame 12 through a center opening 27. The metering release element 26 retains a high energy lever 30 biased by a spring (not shown) in a cocked position until the shutter release button 22 is depressed and the metering release element is raised by the pivotable trigger 24.

Figure 3:
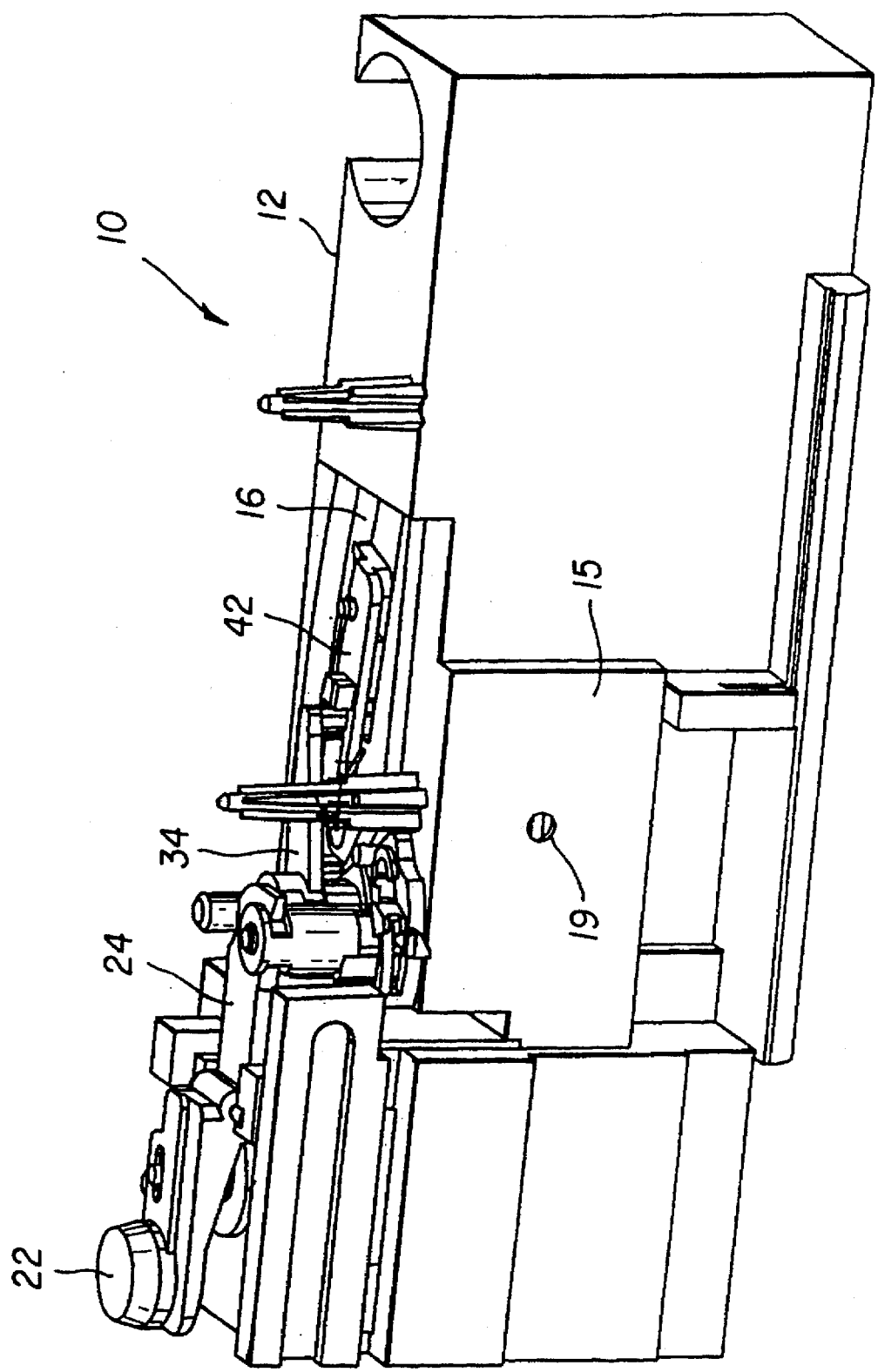
FIG. 3 is a partial front perspective view of the camera of FIG. 1, showing the portion of the film metering mechanism requiring the light lock of the present invention.

As noted, the raising of the metering release element 26 allows the high energy lever 30 to fire, striking a shutter blade (not shown) in a conventional manner to allow ambient light to momentarily enter the exposure chamber 15, FIG. 3, through the taking lens opening 19, FIG. 3, and expose a frame-sized portion 32 of a contained filmstrip 40.

Figure 5:
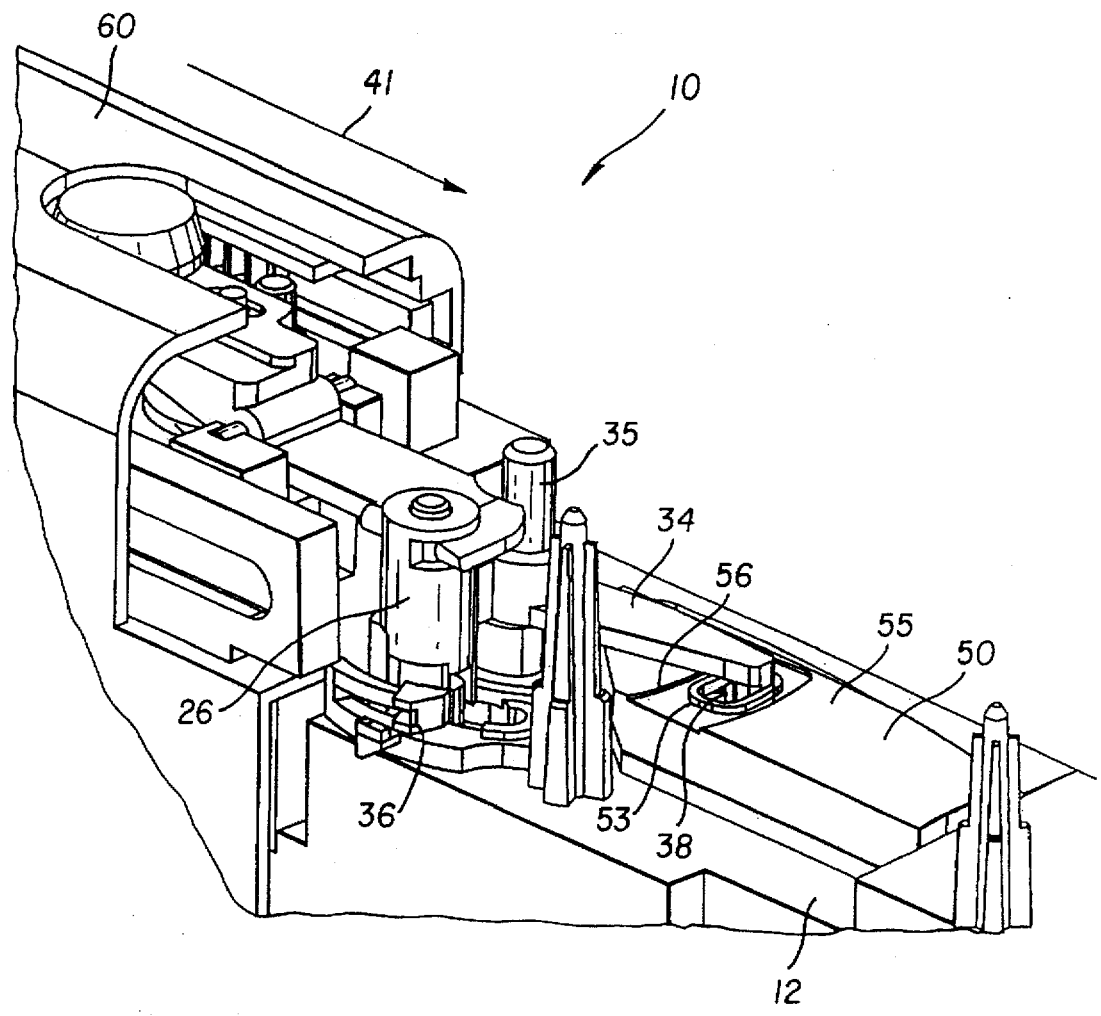
FIG. 5 is an enlarged view of the camera of FIG. 1, showing an attached light locking cover according to the present invention.

According to this embodiment, a pump cover 60, FIG. 5, includes an engagement feature (not shown) which engages a pump cover engaging element 36 of the high energy lever 30 when the cover is translated from an opened to a closed position in the direction 41, FIG. 5, relative to the camera frame 12. The pump cover 60 is illustrated in the opened position in FIG. 5, the function and the workings of which are described in greater detail in copending U.S. Ser. No. 08/577,285 which is incorporated by reference.

Referring mainly to FIG. 2, the engagement of the pump cover 60, FIG. 5, with the pump cover engaging element 36 of the high energy lever 30, causes the metering release element 26 to rotate about the frame post 28, and an exterior feature 37 of the element to engage with and correspondingly rotate the adjacently mounted demetering lever 34, which like the metering release element 26 is mounted through an opening to a frame post 35, shown in FIG. 1 only, and includes an extending arm 39 with a downwardly depending locking pin 38 which is pivoted out of engagement with the film metering member 42, previously referred to in FIG. 1, by the metering release element 26, unlocking the film metering member, which includes a twin metering pawl 44 which extends through the slot 18, FIG. 4, into the film plane for engaging frame-defining perforations 48 of the filmstrip 40.

Referring back to FIGS. 1 and 2, the film metering member 42 is preferably seated to a top surface 13 of the frame 12 by placing a lower portion 58 and a projecting portion 57 of the member, respectively, into a recessed portion 16 and an adjacent slotted portion 14, respectively of the frame. Placement of the metering pawl member 42 as described provides an overall height relative to the frame 12 which minimizes the height of the camera 10. Further, because the recessed portion 16 and slotted portion 14 are each oversized, the film metering member 42 can be moved in an intended manner, as described below.

Still referring to FIGS. 1 and 2, the film metering member 42 is biased by the torsion spring 46, which is wrapped about a pair of top spaced posts 45, 47 of the metering member and to a frame post 51. Once the film metering member 42 is unlocked by the demetering lever 34, by the pivoting of the locking pin 38 out of an engagement slot 62, the film metering member is laterally moved by the engaged filmstrip 40 until a camming surface (not shown) in the lower portion 58 of the film metering member engages a similar camming surface 52 in the recessed portion 16 of the frame 12 and cause disengagement of the filmstrip 40 with the metering pawl 44. The slot 18 is sized to allow the metering pawl 44 to translate appropriately with the filmstrip 40 as described. Similarly, and as noted above, the recessed portion 16 and the slotted portion 14 are also over-sized to allow lateral and pivotal movement of the film metering member 42. Additional details of the film metering member 42 and the fitting of the member to the frame 12 to allow movement are provided in U.S. Ser. No. 08/577,288 which is hereby incorporated by reference.

The torsion spring 46 resets the film metering member 42 to a position which places the metering pawl 44 back into the film plane through the slot 18 in the back of the frame 12 once the filmstrip 40 has been disengaged. The unengaged filmstrip 40 continues to translate until the metering pawl 44 encounters and engages with a new set of frame-defining perforations 48 of the moving filmstrip 40. The film metering member 42 then translates with the advancing filmstrip 40 until the locking pin 38 of the demetering lever 34 reengages the slot 62, locking the film metering member and preventing further movement. Additional details are described in the cross-referenced U.S. Ser. No. 08/577,288.

Reengagement of the demetering lever 34 with the film metering member 42 reverses the previous steps described above. That is, the demetering lever 34 is biased by a spring (not shown) into engagement with the metering release element 26 and pivots, causing a corresponding pivot of the metering release element which causes the metering release element to drop, the trigger 24 to be pivoted and the shutter release button 22 restored to the undepressed state. Preferably, the restoration of the shutter release button 22 to the undepressed state also stops the film advance mechanism (not shown) as described in copending and commonly assigned U.S. Ser. No. 08/577,785, incorporated herein by reference.

As noted above, it is required that no ambient light impinge upon the filmstrip 40 until the filmstrip 40 is advanced into the film cartridge (not shown). In summary, the metering pawl 44 is required to properly meter and demeter the filmstrip 40, it is therefore required to prevent light from entering the film plane through the slot 18.

It is also required, however, for the film metering mechanism 20 to properly operate that access be provided for the demetering lever 34 which must engage the film metering member 42 in order to provide a locking and unlocking function.

Figure 6:
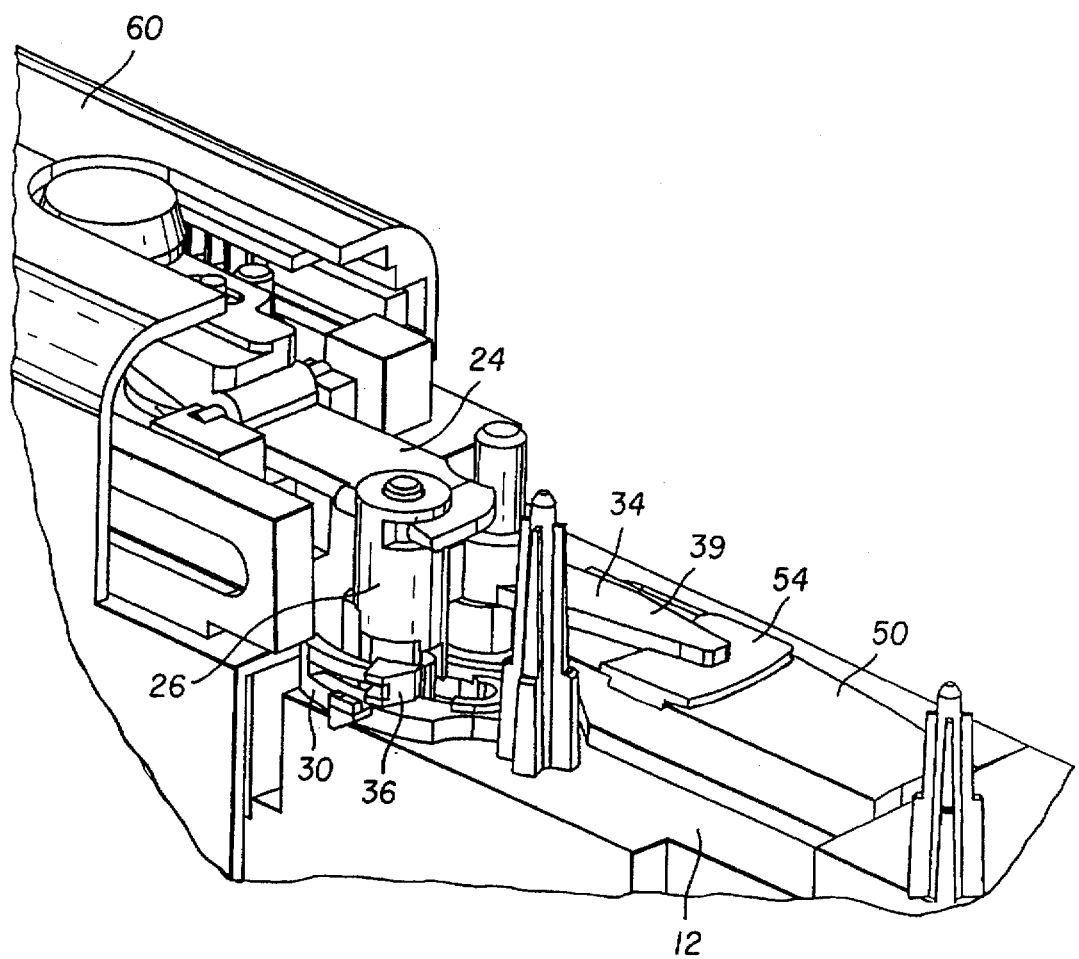
FIG. 6 is the enlarged view of FIG. 5, showing the secondary light locking portion used in accordance with the primary light locking cover of FIG. 5 and according to the present invention.

Referring to FIGS. 1, 5, and 6, the interior light lock of the present invention is herein described. Referring to FIGS. 1 and 5, the light blocking cover 50 is an injection-molded plastic component which rests on the top surface 13 of the camera frame 12. The cover 50 is sized to fit over the assembled film metering member 42 and also covers both the recessed portion 14 and slotted portion 16 to allow the film engaging member to move in its intended manner. A projection 59 engages an interior edge of the recessed portion 16 to anchor the light blocking cover 50 and to insure the cover is seated to the top surface 13, defining a lighttight enclosure for the film engaging member 42 with the exception of an opening or slot 53 in the top surface 55.

The opening 53 of the cover 50 is sized to accommodate the downwardly extending locking pin 38 of the demetering lever 34, and preferably defined by an arc-shaped configuration to allow pivotal movement of the demetering lever. The top surface 55 also preferably contains a recess 56 adjacent the opening 53.

Referring to FIGS. 1, 5, and 6, the demetering lever 34 includes a secondary light blocking portion 54, not shown in FIG. 5, which is preferably integral to the lever immediately adjacent the locking pin 38 beneath the extending arm 39. The secondary light blocking portion 54 is spaced sufficiently to allow the locking pin 38 to enter the opening 53 for engagement with the film engaging member 42. The recess 56 of the light blocking cover 50 is sized to accommodate the light blocking portion 54 of the demetering lever 34 to provide a lighttight seal with the opening 53 when the locking pin 38 is inserted therethrough.

In operation, and referring to the FIGS., the film metering member 42 is unlocked by the above described action of the pump cover 60, ultimately causing the demetering lever 34 to be pivoted against the bias of a demetering spring (not shown), and pivoting the locking pin 38 out of engagement with the film metering member 42. As noted, the opening 53 of the light blocking cover 50 is sized to allow the locking pin 38 to freely pivot to allow the demetering lever to perform its intended function. In the meantime, the seal of the light blocking portion 54 of the demetering lever 34 within the recess 56 prevents ambient light from entering the lighttight enclosure defined by the light blocking cover through the opening 53.

As the filmstrip 40, FIG. 2, is metered, the film metering member 42 moves laterally to allow the locking pin 38 to move from a cam surface (not shown) on the engagement slot 62 and reengage the film metering member under the bias of a demetering spring (not shown) which biases the demetering lever 34. The opening 53 of the light blocking cover 50 allows the locking pin 38 to pivot and allows the remainder of the film metering mechanism 20 to reset in the manner described above while the light blocking portion 54 prevents ambient light from entering the lighttight enclosure of the cover. The specific workings of the film metering and film advancing mechanism are described in the previously cross-referenced 08/577,285 and 08/577,288 applications.

Throughout the entire sequence, the locking pin 38 remains in the lighttight enclosure defined by the light blocking cover 50 while the secondary light blocking portion 54 of the demetering lever remains sealed in a lighttight manner with the top surface of the cover within the recess 56. The light blocking portion 56 can pivot with the remainder of the demetering lever 34 while so engaged.

The invention has been described with reference to a specific embodiment involving a pump type of camera. However, it will be appreciated that variations and modifications can be effected by a person of ordinary skill in the art without departing from the scope of the invention.

Parts List For FIGS. 1–6

10 camera
12 frame
13 top surface
14 slotted portion
15 exposure chamber
16 recessed portion
17 film roll chamber
18 slot
19 film cartridge chamber
20 film metering mechanism
21 taking lens opening
22 shutter release button
23 end
24 trigger
25 end
26 metering release element
27 center opening
28 post
30 high energy lever
32 frame
34 demetering lever
35 post 36 pump cover engaging element
37 exterior feature
38 locking portion
39 end
40 filmstrip
41 direction
42 film metering member
44 metering pawl
45 post
46 spring
47 post
48 perforations
50 light locking cover
51 post
52 cammed surface
53 opening
54 light blocking portion
55 top surface
56 recess
57 projecting portion
58 lower portion
59 projecting portion
60 pump cover
62 engagement slot

We claim:

1. A camera comprising:

a frame;

a movable film engaging member attached to said frame;

means for locking and unlocking the movable film engaging member; and light lock means for preventing ambient light from striking a filmstrip engaged by the film engaging member, is characterized by:

a first light locking cover for covering the movable film engaging member, said cover having an opening for allowing the locking and unlocking means to engage the film engaging member wherein said locking and unlocking means includes a second light locking cover for covering said opening while allowing said means to engage the film engaging member.

2. A camera according to claim 1, wherein said locking and unlocking means includes a pivotable lever element having a locking portion for locking said film engaging member when engaged.

3. A camera according to claim 2, wherein the locking portion is sized to fit through the opening of the first light locking cover while the remainder of said lever element is outside said cover.

4. A camera according to claim 3, wherein the second light locking cover sized to cover said opening of the first light locking cover.

5. A camera according to claim 4, wherein said first light locking cover includes a recessed area around said opening and said second light locking cover is sized to fit in said recessed area to block light from entering said opening.

6. A camera according to claim 5, wherein said opening is sized to allow said engaging portion to move in and out of engagement with said first member, while remaining within the defined lighttight enclosure.

7. A camera as recited in claim 6, wherein the second light locking cover is integral with the lever element.

8. A camera comprising:

a frame;

a movable film engaging member attached to said frame;

a locking portion for locking and unlocking said movable film engaging member; and first and second light locking covers for preventing ambient light from striking a filmstrip engaged by the film engaging member, said first light locking cover covering said film engaging member, said first light locking cover having an opening for allowing said locking portion to engage said film engaging member, said second light locking cover covering said opening while allowing said locking portion to engage said film engaging member.

9. The camera of claim 8 wherein said second light locking cover is integral with said locking portion.

10. The camera of claim 8 wherein said first light locking cover is large enough to cover said film engaging member over a range of movement of said film engaging member.

11. The camera of claim 8 wherein said first light locking cover includes a recessed area around said opening and said second light locking cover is sized to fit into said recessed area.

12. A camera comprising:

a frame;

a movable film engaging member attached to said frame;

a first light locking cover covering said movable film engaging member, said cover having an opening;

a lock member displaceable between a first configuration wherein said film engaging member is locked and a second configuration wherein said film engaging member is unlocked, said lock member including a locking portion and a second light locking cover, said locking portion engaging said film engagement portion through said opening, said second light locking cover covering said opening and said engagement portion;

whereby light is locked from a filmstrip engaged by said film engaging member.

13. The camera of claim 12 wherein said first light locking cover is large enough to cover said film engaging member over a range of movement of said film engaging member.

14. The camera of claim 13 wherein said first light locking cover includes a recessed area around said opening and said second light locking cover is sized to fit into said recessed area.

* * * * *